(12) United States Patent
Komura et al.

(10) Patent No.: US 9,787,542 B2
(45) Date of Patent: Oct. 10, 2017

(54) TRAIN-INFORMATION MANAGEMENT DEVICE AND TRAIN-INFORMATION MANAGEMENT METHOD

(71) Applicant: MITSUBISHI ELECTRIC CORPORATION, Tokyo (JP)

(72) Inventors: Tetsuo Komura, Tokyo (JP); Takashi Miyauchi, Tokyo (JP); Toshiko Kadono, Tokyo (JP); Akinori Yoshinaga, Tokyo (JP); Joji Ido, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 172 days.

(21) Appl. No.: 14/758,281

(22) PCT Filed: May 20, 2013

(86) PCT No.: PCT/JP2013/063946
§ 371 (c)(1),
(2) Date: Jun. 29, 2015

(87) PCT Pub. No.: WO2014/188487
PCT Pub. Date: Nov. 27, 2014

(65) Prior Publication Data
US 2015/0358199 A1      Dec. 10, 2015

(51) Int. Cl.
*H04L 12/24*     (2006.01)
*B61L 15/00*     (2006.01)
(Continued)

(52) U.S. Cl.
CPC ............ *H04L 41/082* (2013.01); *B60L 1/003* (2013.01); *B60L 1/02* (2013.01); *B60L 11/1861* (2013.01);
(Continued)

(58) Field of Classification Search
CPC .. H04L 41/0654; H04L 41/082; H04L 41/042; H04L 29/06; H04L 29/06027;
(Continued)

(56) References Cited

U.S. PATENT DOCUMENTS 5,077,732 A * 12/1991 Fischer .................. H04L 12/28
                                                                   370/437
6,282,469 B1 * 8/2001 Rogers ................ B60R 16/0231
                                                                   701/31.4
(Continued)

FOREIGN PATENT DOCUMENTS

CA          2 551 122 A1      7/2005
CA          2 833 292 A1     10/2012
(Continued)

OTHER PUBLICATIONS

Vehicle Information Monitor and Tranmsission Method of the Same—May 10, 2012 by Mori Masahiro.*
(Continued)

*Primary Examiner* — Sargon Nano
(74) *Attorney, Agent, or Firm* — Buchanan Ingersoll & Rooney PC (57) ABSTRACT

A central device includes an information replacing unit. When the information replacing unit detects, on the basis of contact information acquired from an electric coupler provided in a coupled vehicle in a formation B having a train-information management device that manages vehicle information in accordance with the Ethernet® protocol, that a formation A that includes a train-information management device that manages vehicle information in accordance with the ARCNET protocol is coupled to the formation B, then the information replacing unit replaces vehicle information from the formation A with vehicle information in accordance with the Ethernet® protocol; outputs the replaced vehicle information to the formation B; replaces the vehicle infor-
(Continued)

mation from the formation B with the vehicle information in accordance with the ARCNET protocol; and outputs the replaced vehicle information to the formation A.

4 Claims, 9 Drawing Sheets

(51) Int. Cl.
  *B61L 25/02* (2006.01)
  *B61L 27/00* (2006.01)
  *B60L 15/42* (2006.01)
  *B60L 1/00* (2006.01)
  *B60L 1/02* (2006.01)
  *B60L 11/18* (2006.01)
  *H04L 12/40* (2006.01)

(52) U.S. Cl.
  CPC ........... *B60L 15/42* (2013.01); *B61L 15/0036* (2013.01); *B61L 15/0072* (2013.01); *B61L 15/0081* (2013.01); *B61L 25/02* (2013.01); *B61L 25/028* (2013.01); *B61L 27/00* (2013.01); *H04L 12/40006* (2013.01); *H04L 41/042* (2013.01); *B60L 2200/26* (2013.01); *B60L 2210/40* (2013.01); *B60L 2240/34* (2013.01); *B60L 2240/36* (2013.01); *H04L 2012/40208* (2013.01); *H04L 2012/40293* (2013.01); *Y02T 10/7005* (2013.01); *Y02T 10/705* (2013.01); *Y02T 10/7044* (2013.01); *Y02T 10/7241* (2013.01)

(58) Field of Classification Search
  CPC ..... H04L 45/00; H04L 45/42; H04L 65/4084; H04L 67/42; B61C 17/12; B61L 25/02; B61L 27/00; B61L 3/006; B61L 15/0036; B61L 15/00; B61L 15/0018
  See application file for complete search history.

(56) References Cited

U.S. PATENT DOCUMENTS

| | | | | |
|---|---|---|---|---|
| 6,622,799 | B2* | 9/2003 | Dean | E21B 33/0355 166/339 |
| 7,451,842 | B2* | 11/2008 | Hemmi | B60L 9/22 180/65.1 |
| 8,260,855 | B2 | 9/2012 | Ido et al. | |
| 8,532,148 | B2 | 9/2013 | Homma et al. | |
| 8,532,850 | B2* | 9/2013 | Cooper | B60T 13/665 375/258 |
| 8,798,821 | B2* | 8/2014 | Kraeling | B60T 13/665 375/220 |
| 8,825,239 | B2* | 9/2014 | Cooper | B61L 3/20 188/153 R |
| 8,935,022 | B2* | 1/2015 | Cooper | B61L 15/0036 180/14.1 |
| 2005/0187717 | A1* | 8/2005 | Paxson | G06F 19/12 702/19 |
| 2006/0031590 | A1 | 2/2006 | Monette et al. | |
| 2006/0136138 | A1* | 6/2006 | Hicklin | G06F 19/12 702/19 |
| 2007/0005317 | A1* | 1/2007 | Paxson | G05B 17/02 703/11 |
| 2007/0250299 | A1* | 10/2007 | Paxson | G06F 19/26 703/11 |
| 2008/0002709 | A1* | 1/2008 | Kennedy | H04L 12/2856 370/395.1 |
| 2008/0004760 | A1* | 1/2008 | Sogihara | B60L 3/0076 701/22 |
| 2008/0208401 | A1* | 8/2008 | Kumar | B61L 3/006 701/19 |
| 2008/0288120 | A1 | 11/2008 | Lindenmuth et al. | |
| 2010/0322267 | A1 | 12/2010 | Homma et al. | |
| 2011/0113093 | A1 | 5/2011 | Ido et al. | |
| 2013/0110973 | A1 | 5/2013 | Menjo | |
| 2013/0261842 | A1* | 10/2013 | Cooper | B61L 15/0081 701/1 |
| 2014/0041011 | A1 | 2/2014 | Beyer et al. | |
| 2015/0200712 | A1* | 7/2015 | Cooper | H04B 3/54 375/257 |
| 2015/0217790 | A1* | 8/2015 | Golden | B61L 15/0072 701/19 |
| 2015/0381458 | A1* | 12/2015 | Ogawa | H04L 12/40202 370/252 |

FOREIGN PATENT DOCUMENTS

| | | |
|---|---|---|
| CN | 202453730 U | 9/2012 |
| EP | 1 995 652 A1 | 11/2008 |
| EP | 2 219 086 A1 | 8/2010 |
| EP | 2 221 209 A1 | 8/2010 |
| JP | 2008-131797 A | 6/2008 |
| JP | 2008-306710 A | 12/2008 |
| JP | 2011-050213 A | 3/2011 |
| JP | 2011-055416 A | 3/2011 |
| JP | 2011-205777 A | 10/2011 |
| JP | 2012-090369 A | 5/2012 |
| WO | WO 2013/061451 A1 | 5/2013 |

OTHER PUBLICATIONS

International Search Report (PCT/ISA/210) mailed on Aug. 13, 2013, by the Japanese Patent Office as the International Searching Authority for International Application No. PCT/JP2013/063946.
Written Opinion (PCT/ISA/237) mailed on Aug. 13, 2013, by the Japanese Patent Office as the International Searching Authority for International Application No. PCT/JP2013/063946.
Japanese Office Action mailed Mar. 31, 2015 in Japanese Application No. 2015-509249, with English language translation (5 pages).
Extended European Search Report issued Jan. 5, 2017 in corresponding European Patent Application No. 13885038.3, 11 pages.

* cited by examiner

| No | FIRST-SYSTEM INFORMATION REPLACING UNIT | SECOND-SYSTEM INFORMATION REPLACING UNIT | FIRST-SYSTEM INFORMATION TRANSMITTING UNIT | SECOND-SYSTEM INFORMATION TRANSMITTING UNIT | DETERMINATION |
|---|---|---|---|---|---|
| 1 | NO CONNECTION | NO CONNECTION | NO CONNECTION | NO CONNECTION | NO COUPLING |
| 2 | CONNECTION | NO CONNECTION | NO CONNECTION | NO CONNECTION | DIFFERENT VEHICLE-TYPE COUPLING |
| 3 | NO CONNECTION | CONNECTION | NO CONNECTION | NO CONNECTION | DIFFERENT VEHICLE-TYPE COUPLING |
| 4 | NO CONNECTION | NO CONNECTION | CONNECTION | NO CONNECTION | SAME VEHICLE-TYPE COUPLING |
| 5 | NO CONNECTION | NO CONNECTION | NO CONNECTION | CONNECTION | SAME VEHICLE-TYPE COUPLING |
| 6 | CONNECTION | CONNECTION | NO CONNECTION | NO CONNECTION | DIFFERENT VEHICLE-TYPE COUPLING |
| 7 | CONNECTION | NO CONNECTION | CONNECTION | NO CONNECTION | SAME VEHICLE-TYPE COUPLING |
| 8 | CONNECTION | NO CONNECTION | NO CONNECTION | CONNECTION | SAME VEHICLE-TYPE COUPLING |
| 9 | NO CONNECTION | CONNECTION | CONNECTION | NO CONNECTION | SAME VEHICLE-TYPE COUPLING |
| 10 | NO CONNECTION | CONNECTION | NO CONNECTION | CONNECTION | SAME VEHICLE-TYPE COUPLING |
| 11 | NO CONNECTION | NO CONNECTION | CONNECTION | CONNECTION | SAME VEHICLE-TYPE COUPLING |
| 12 | NO CONNECTION | CONNECTION | CONNECTION | CONNECTION | SAME VEHICLE-TYPE COUPLING |
| 13 | CONNECTION | NO CONNECTION | CONNECTION | CONNECTION | SAME VEHICLE-TYPE COUPLING |
| 14 | CONNECTION | CONNECTION | NO CONNECTION | CONNECTION | SAME VEHICLE-TYPE COUPLING |
| 15 | CONNECTION | CONNECTION | CONNECTION | NO CONNECTION | SAME VEHICLE-TYPE COUPLING |
| 16 | CONNECTION | CONNECTION | CONNECTION | CONNECTION | SAME VEHICLE-TYPE COUPLING |

TRAIN-INFORMATION MANAGEMENT DEVICE AND TRAIN-INFORMATION MANAGEMENT METHOD

FIELD

The present invention relates to a train-information management device and a train-information management method.

BACKGROUND

A train-information management device monitors and controls on-vehicle devices. The train-information management device is provided in each vehicle of a train and generally includes a central device and a terminal device. The central device is provided in the vehicles at the ends of the formation, and the terminal device is provided in the intermediate vehicles. Patent Literature 1 discloses a configuration example in which the central device is provided in a first vehicle of a train and the terminal devices are provided on other vehicles, respectively (see Patent Literature 1 described below).

CITATION LIST

Patent Literature

Patent Literature 1: Japanese Patent Application Laid-open No. 2008-131797

SUMMARY

Technical Problem

However, with the situation in which the standard transmission specification in a vehicle is a mixture of train-information management devices compatible with the Ethernet®, which is being standardized internationally, and train-information management devices compatible with ARCNET, which has been generally adopted in Japan, there is a problem in that, when formations that are the same but have different transmission specifications are coupled together, it becomes difficult to operate the train-information management device after the formations have been coupled.

The present invention has been achieved in view of the above problems, and an objective of the present invention is to provide a train-information management device and a train-information management method that enables formations that are provided with train-information management devices that are compatible with the Ethernet® and formations that are provided with train-information management devices that are compatible with ARCNET to be coupled to each other and to communicate.

Solution to Problem

In order to solve the problem mentioned above and achieve the objective, the present invention relates to a train-information management device that includes a central device that is connected to the Ethernet® provided over a plurality of vehicles constituting a train formation and that manages vehicle information in accordance with the Ethernet® protocol. The central device includes an information replacing unit that, when having detected that a second formation including a train-information management device that manages vehicle information in accordance with an ARCNET protocol is coupled to a coupled vehicle in a first formation having the train-information management device, replaces vehicle information from the first formation with vehicle information in accordance with the ARCNET protocol and outputs the replaced vehicle information to the second formation, and replaces the vehicle information from the second formation with the vehicle information in accordance with the Ethernet® protocol and outputs the replaced vehicle information to the first formation; and an information transmitting unit that, when having detected that a third formation of a same type as the first formation is coupled to the first formation, outputs vehicle information from the third formation to the first formation, and outputs the vehicle information from the first formation to the third formation.

Advantageous Effects of Invention

According to the present invention, information transmittable via the Ethernet® of a coupled formation is translated into information transmittable via the ARCNET of a formation to which the coupled formation is to be coupled (hereinafter, a formation to be coupled), and information transmittable via the ARCNET of the formation to which the coupled formation is to be coupled is translated into information transmittable via the Ethernet® of the coupled formation. Accordingly, an advantageous effect can be achieved whereby formations can be coupled together where one formation is provided with a train-information management device compatible with the Ethernet® and one formation is provided with a train-information management device compatible with the ARCNET.

DESCRIPTION OF EMBODIMENTS

Exemplary embodiments of a train-information management device and a train-information management method according to the present invention will be described below in detail with reference to the accompanying drawings. The present invention is not limited to the embodiments.

Embodiment

Figure 1:
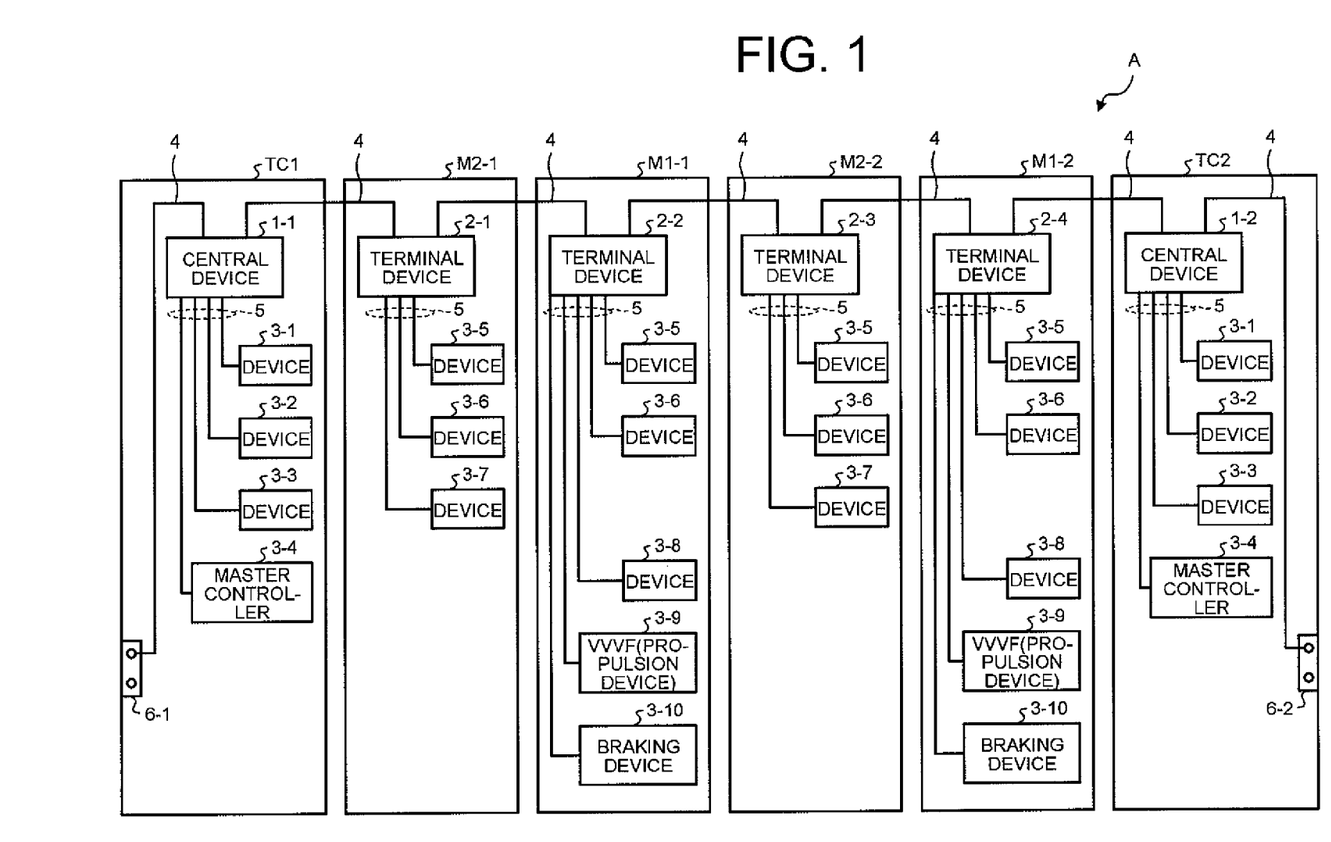
FIG. 1 is a configuration diagram illustrating a formation A provided with a train-information management device compatible with the ARCNET.

FIG. 1 is a configuration diagram illustrating a formation A provided with a train-information management device compatible with the ARCNET. The train formation A includes, for example, six vehicles, and specifically includes vehicles TC1, M2-1, M1-1, M2-2, M1-2, and TC2. A similar configuration can be used if the number of vehicles in formation A is increased or decreased.

The vehicles TC1 and TC2 located at the opposite ends in the formation A are provided with central devices 1-1 and 1-2 of the train-information management device, respectively. The vehicles M2-1, M1-1, M2-2, and M1-2 serving as the intermediate vehicles in the formation A are provided with terminal devices 2-1, 2-2, 2-3, and 2-4 of the train-information management device, respectively. The train-information management device provided in the formation A includes the central devices 1-1 and 1-2 and the terminal devices 2-1 to 2-4. The central devices 1-1 and 1-2 and the terminal devices 2-1 to 2-4 are connected to each other via a backbone transmission line (an inter-vehicle transmission line) 4 provided over the vehicles so that they are able to communicate with each other. The backbone transmission line 4 is compatible with ARCNET, which adopts a token passing protocol; and the transmission speed thereof is, for example, 2.5 Mbps. The backbone transmission line 4 is constituted by, for example, a ladder transmission line, as illustrated in FIG. 1, that is across the train-information management device.

The vehicle TC1 includes the central device 1-1, devices 3-1 to 3-3 respectively connected to the central device 1-1 via a branch transmission line (an in-vehicle transmission line) 5, a master controller (a backbone controller) 3-4 connected to the central device 1-1 via the branch transmission line 5, and an electric coupler 6-1 connected to the central device 1-1 via the backbone transmission line 4.

The branch transmission line 5 is a communication line provided in the vehicle. The devices 3-1 to 3-3 include, for example, an air conditioner and a braking device. The central device 1-1 transmits control data for respectively controlling the devices 3-1 to 3-3 and acquires device information (status data) respectively from the devices 3-1 to 3-3. The master controller 3-4 is also controlled and managed by the central device 1-1 similarly to the devices 3-1 to 3-3. The master controller 3-4 transmits control data such as power-running notch information (acceleration information) and brake notch information (deceleration information) input from a motorman's cab (not illustrated) to the central device 1-1. The electric coupler 6-1 enables electrical coupling between the vehicle TC1 and other vehicles, and is used when coupling the formation A and another formation on the side of the vehicle TC1. The electric coupler 6-1 includes a plurality of pins, and these pins come into contact with pins of another electric coupler, thereby enabling the electric couplers to electrically connect. The backbone transmission line 4 connecting the central device 1-1 and the electric coupler 6-1 is connected to a predetermined part of a pin group of the electric coupler 6-1.

The vehicle M2-1 includes the terminal device 2-1 and devices 3-5 to 3-7 respectively connected to the terminal device 2-1 via the branch transmission line 5. The devices 3-5 to 3-7 are, for example, an air conditioner, a braking device, and a motor. The terminal device 2-1 transmits control data for respectively controlling the devices 3-5 to 3-7 and acquires device information (status data) respectively from the devices 3-5 to 3-7.

The vehicle M1-1 includes the terminal device 2-2, devices 3-5, 3-6, and 3-8 respectively connected to the terminal device 2-2 via the branch transmission line 5, a VVVF (a propulsion device) 3-9 connected to the terminal device 2-2 via the branch transmission line 5, and a braking device 3-10 connected to the terminal device 2-2 via the branch transmission line 5. The devices 3-5, 3-6, and 3-8 are, for example, an air conditioner and a motor. The VVVF 3-9 is a VVVF inverter. The terminal device 2-2 transmits control data for respectively controlling the devices 3-5, 3-6, and 3-8, the VVVF 3-9, and the braking device 3-10, and acquires device information (status data) respectively from the devices 3-5, 3-6, and 3-8, the VVVF 3-9, and the braking device 3-10.

The vehicle M2-2 has the same configuration as that of the vehicle M2-1. That is, the vehicle M2-2 includes the terminal device 2-3 and devices 3-5 to 3-7, which are each connected to the terminal device 2-3 via the branch transmission line 5. The terminal device 2-3 has the same functions as that of the terminal device 2-1.

The vehicle M1-2 has the same configuration as that of the vehicle M1-1. That is, the vehicle M1-2 includes the terminal device 2-4, devices 3-5, 3-6, and 3-8, which are each connected to the terminal device 2-4 via the branch transmission line 5, the VVVF (the propulsion device) 3-9 connected to the terminal device 2-4 via the branch transmission line 5, and the braking device 3-10 connected to the terminal device 2-4 via the branch transmission line 5. The terminal device 2-4 has the same functions as that of the terminal device 2-2.

The vehicle TC2 has the same configuration as that of the vehicle TC1. That is, the vehicle TC2 includes the central device 1-2, devices 3-1 to 3-3, which are each connected to the central device 1-2 via the branch transmission line (the in-vehicle transmission line) 5, the master controller (the backbone controller) 3-4 connected to the central device 1-2 via the branch transmission line 5, and an electric coupler 6-2 connected to the central device 1-2 via the backbone transmission line 4. The central device 1-2 has the same function as that of the central device 1-1. The electric coupler 6-2 also has the same function as that of the electric coupler 6-1. The electric coupler 6-2 enables electric coupling between the vehicle TC2 and other vehicles, and it is used when the formation A and another formation on the side of the vehicle TC2 are coupled together. The electric coupler 6-2 includes a plurality of pins, and these pins come in contact with pins of another electric coupler, thereby enabling electric connection between the electric couplers. The backbone transmission line 4 connecting the central device 1-2 and the electric coupler 6-2 is connected to a predetermined part of the pin group of the electric coupler 6-2.

In the following descriptions, when simply described as "device 3", it is assumed that it includes not only the devices 3-1 to 3-3 and 3-5 to 3-8, but also the master controller 3-4, the VVVF 3-9, and the braking device 3-10, and it collectively means these devices. When simply described as "terminal device 2", it is assumed that it collectively means the terminal devices 2-1 to 2-4. Further, when simply described as "central device 1", it is assumed that it collectively means the central devices 1-1 and 1-2.

The central device 1 transmits status data collected from the device 3 in the same vehicle to the terminal device 2 and the other central device 1 via the backbone transmission line 4. The terminal device 2 also transmits status data collected for the device 3 in the same vehicle to the other terminal devices 2 and the central device 1 via the backbone transmission line 4. In this manner, the central device 1 and the terminal device 2 share the status data relating to the device 3 in the train and manage the collected status data and information relating to the running of the train as train information.

Figure 2:
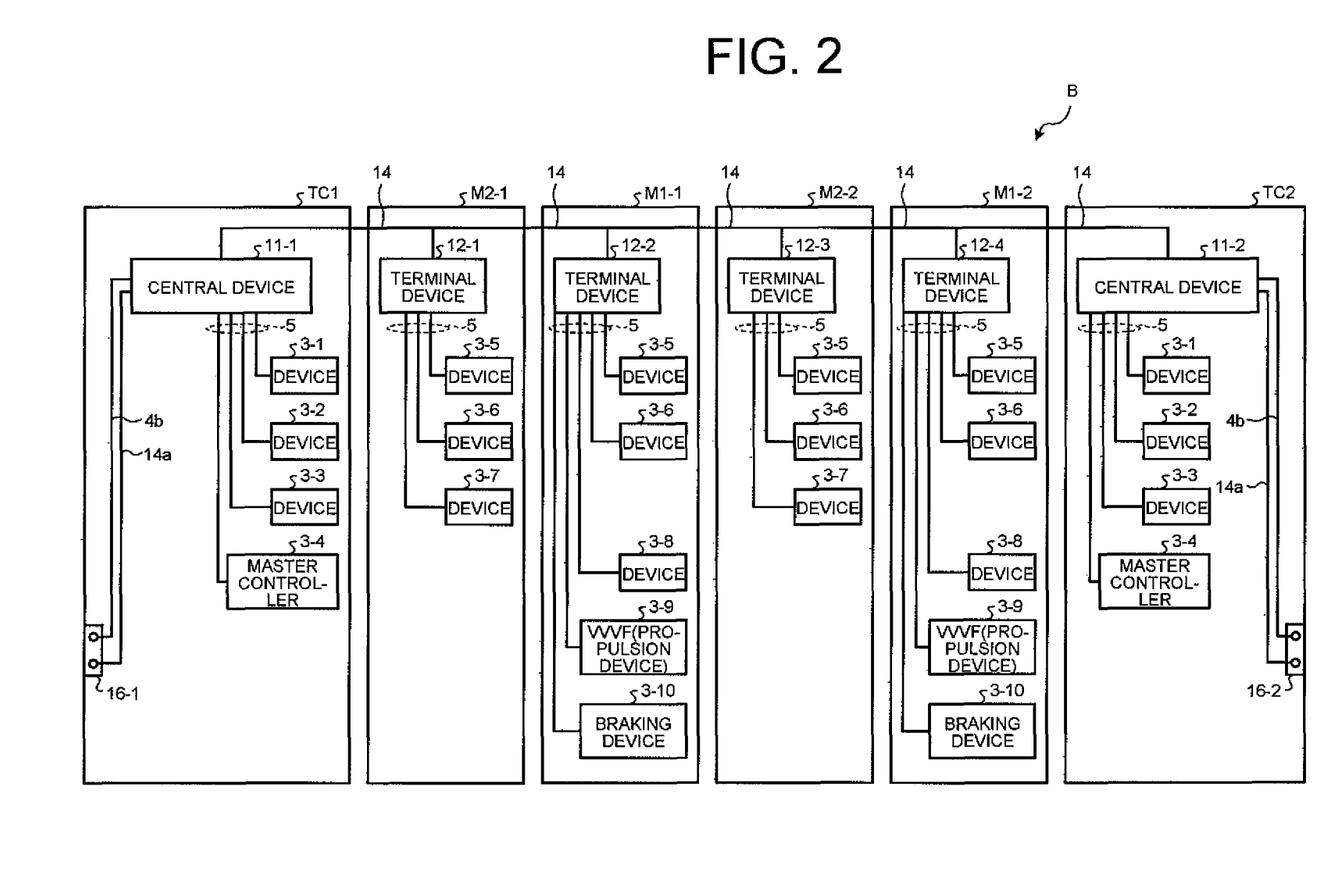
FIG. 2 is a configuration diagram illustrating a formation B provided with a train-information management device according to an embodiment of the present invention.

FIG. 2 is a configuration diagram illustrating a formation B provided with a train-information management device according to an embodiment of the present invention. In FIG. 2, constituent elements identical to those in FIG. 1 are denoted by like reference signs and detailed descriptions thereof will be omitted.

The train formation B includes, for example, six vehicles, and it specifically includes vehicles TC1, M2-1, M1-1, M2-2, M1-2, and TC2. A similar configuration can be used whether the number of vehicles in formation A is increased or decreased.

The vehicles TC1 and TC2 located at the opposite ends in the formation B are provided with central devices 11-1 and 11-2 of the train-information management device, respectively. The vehicles M2-1, M1-1, M2-2, and M1-2 serving as the intermediate vehicles in the formation B are provided with terminal devices 12-1, 12-2, 12-3, and 12-4 of the train-information management device, respectively. The central devices 11-1 and 11-2 and the terminal devices 12-1 to 12-4 are connected to each other via a backbone transmission line (an inter-vehicle transmission line) 14 provided over the vehicles so that they are able to communicate with each other. The backbone transmission line 14 uses the Ethernet®, and the transmission speed thereof is, for example, 100 Mbps. The backbone transmission line 14 is constituted by, for example, a bus transmission line, as illustrated in FIG. 2, with respect to the train-information management device.

The central device 11-1 in the vehicle TC1 is connected to an electric coupler 16-1 via an in-vehicle transmission line 14a and an in-vehicle transmission line 4b. That is, the central device 11-1 is connected to the electric coupler 16-1 by two transmission lines having a different transmission specification from each other. The central device 11-1 has a function (hereinafter, "information replacing function") of, when the formation A and the formation B are coupled, replacing information in accordance with the ARCNET protocol transmitted across the formation A with information in accordance with the Ethernet® transmitted in the formation B; and replacing the information in accordance with the Ethernet® transmitted in the formation B with the information in accordance with the ARCNET protocol transmitted in the formation A. Details of the information replacing function are described later.

Figure 5:
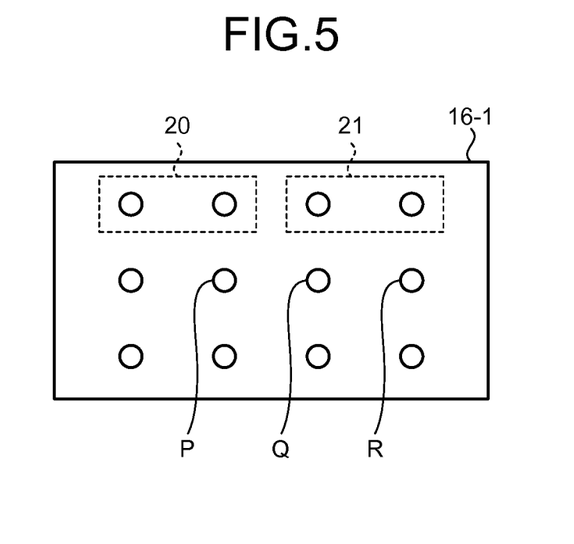
FIG. 5 is a diagram illustrating an example of a pin structure of an electric coupler.

FIG. 5 illustrates an example of a pin structure of an electric coupler. In FIG. 5, the pin structure of the electric coupler 16-1 in the formation B is illustrated. Twelve pins are, for example, provided in the electric coupler 16-1. Among these pins, a pin P is for checking the coupling, and pins Q and R are for determination of the formation type. With respect to the pins P, Q, and R, for example, if a contact position is only at the pin P, it is determined that the formation to be coupled is the "formation B" provided with the train-information management device compatible with the Ethernet®. Transmission and reception of the vehicle information at this time are performed, for example, via the pin 21. Further, with respect to the pins P, Q, and R, for example, if the contact positions are at the pin P and the pin Q, it is determined that the formation to be coupled is the "formation A" provided with the train-information management device compatible with the ARCNET. Transmission and reception of the vehicle information at this time are performed, for example, via a pin 20.

The in-vehicle transmission line 14a that connects the central device 11-1 and the electric coupler 16-1 is connected to the pin 21 of the electric coupler 16-1. The in-vehicle transmission line 4b that connects the central device 11-1 and the electric coupler 16-1 is connected to the pin 20 of the electric coupler 16-1.

The configurations of the central device 11-1 and the electric coupler 16-1 mentioned above are the same for the central device 11-2 and an electric coupler 16-2 in the vehicle TC2. Other configurations of the formation B are identical to those of the formation A in FIG. 1. Specifically, it is as described with reference to FIG. 2 that a device group is respectively connected to each of the central devices 11-1 and 11-2 and the terminal devices 12-1 to 12-4, and the data transmission and reception processing is performed between the central devices 11-1 and 11-2 and the terminal devices 12-1 to 12-4 and their respective device groups. In the following descriptions, when simply described as "central device 11", it is assumed that it collectively means the central devices 11-1 and 11-2.

Figure 3:
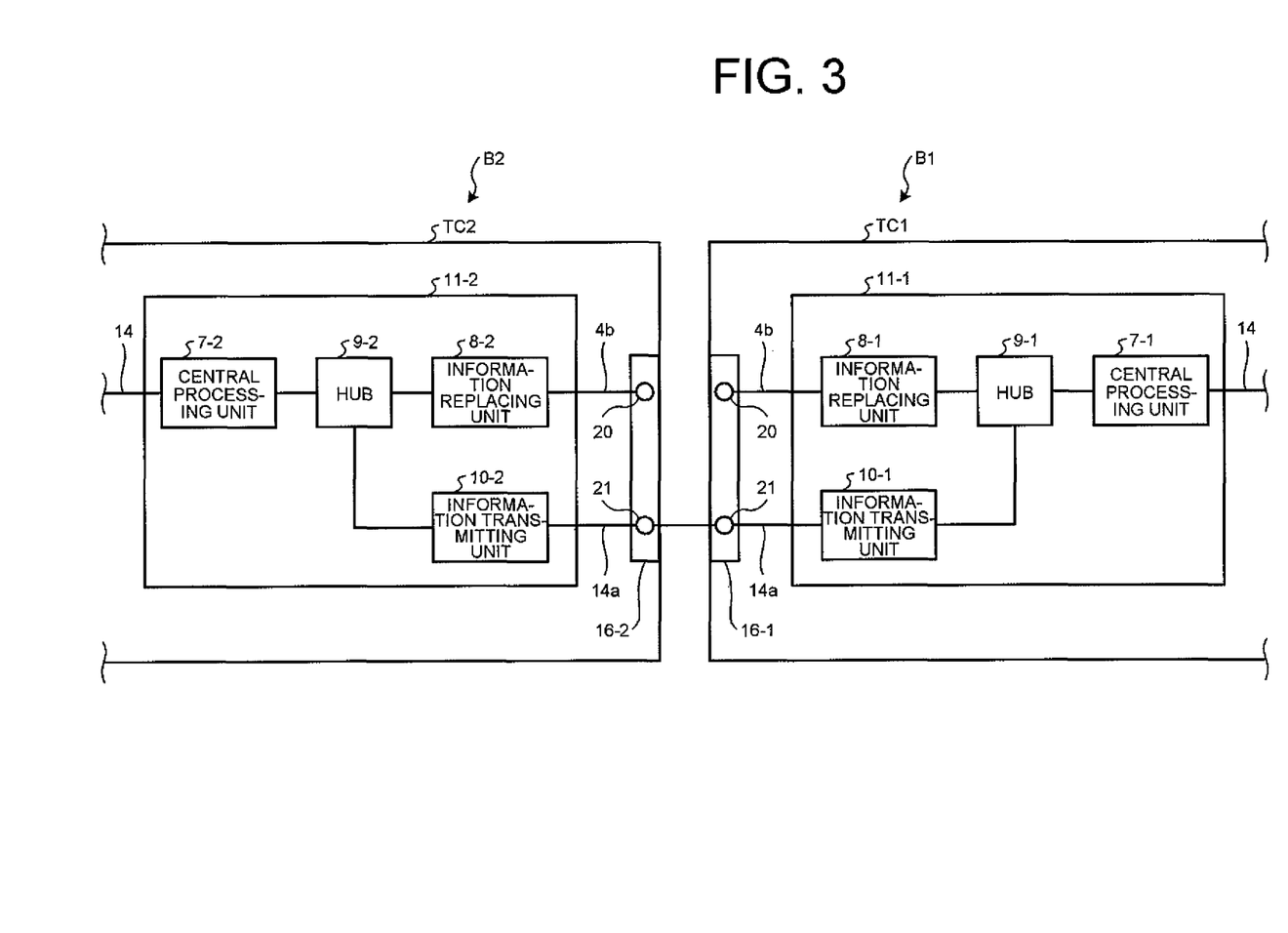
FIG. 3 is a system configuration diagram illustrating when a formation B1 and a formation B2 are coupled together.

FIG. 3 is a system configuration diagram illustrating when a formation B1 and a formation B2 are coupled. FIG. 3 illustrates an example in which the vehicle TC1 in the formation B1 and the vehicle TC2 in the formation B2 are coupled, thereby coupling the formation B1 to the formation B2. The formations B1 and B2 respectively include the central device 11 in the vehicle at the end of the formation, as in the formation B illustrated in FIG. 2, and the train-information management device is connected to the backbone transmission line 14 in the formations B1 and B2.

In FIG. 3, the vehicle TC1 (e.g., a coupled vehicle) in the formation B1 and the vehicle TC2 (e.g., a vehicle to be coupled to the vehicle TC1) in the formation B2 are illustrated. Further, in FIG. 3, among the devices provided in the vehicle TC1, the central device 11-1 and the electric coupler 16-1 are illustrated; and among the devices provided in the vehicle TC2, the central device 11-2 and the electric coupler 16-2 are illustrated.

In the following descriptions, it is assumed that the formation B1 and the formation B2 have the same vehicle configuration as that of the formation B. Regarding the coupling method, needless to mention, even if such a specific example is described, the generality of the coupling method is not lost. The above holds in the same manner when the vehicle TC2 in the formation B1 and the vehicle TC2 in the formation B2 are coupled, when the vehicle TC1 in the formation B1 and the vehicle TC1 in the formation B2 are coupled, or when the vehicle TC2 in the formation B1 and the vehicle TC1 in the formation B2 are coupled.

First, the central device 11-1 in the formation B1 is described here. The central device 11-1 includes an information replacing unit 8-1 having an information replacing function, a HUB 9-1, a central processing unit 7-1, and an information transmitting unit 10-1.

The information replacing unit 8-1 is provided between the in-vehicle transmission line 4b and the HUB 9-1. The central processing unit 7-1 controls the function of the central device 11-1, and it collects status data so as to collectively manage on-vehicle devices.

The information replacing unit 8-1, the central processing unit 7-1, and the information transmitting unit 10-1 are connected to the HUB 9-1. The information transmitting unit 10-1 is provided between the in-vehicle transmission line 14a and the HUB 9-1. The information transmitting unit 10-1 can transmit information in accordance with Ethernet® protocol (a UDP (User Datagram Protocol) frame). That is, the information transmitting unit 10-1 performs transmission of the UDP frame between the central processing unit 7-1 and the unit itself, and transmission of the UDP frame between the information transmitting unit 10-2 in the formation B2 and the unit itself.

The central device 11-2 in the formation B2 is described next. The central device 11-2 includes an information replacing unit 8-2, a HUB 9-2, a central processing unit 7-2, and the information transmitting unit 10-2.

The information replacing unit 8-2, the central processing unit 7-2, and the information transmitting unit 10-2 are each connected to the HUB 9-2. The information replacing unit 8-2 corresponds to the information replacing unit 8-1 in the formation B1, the HUB 9-2 corresponds to the HUB 9-1 in the formation B1, the central processing unit 7-2 corresponds to the central processing unit 7-1 in the formation B1, and the information transmitting unit 10-2 corresponds to the information transmitting unit 10-1 in the formation B1. The respective functions thereof are as described above for the central device 11-1. In the following descriptions, when simply described as the "information replacing unit 8", it is assumed that it collectively means the information replacing units 8-1 and 8-2. Details of the information replacing unit 8 are described in the description of the operation when the formation A and the formation B are coupled.

Operations of the entire system when the formation B1 and the formation B2 are coupled are described next. When the formation B1 and the formation B2 are coupled, the vehicle TC1 in the formation B1 and the vehicle TC2 in the formation B2 are mechanically coupled by a coupler (not illustrated). Further, the pin 21 of the electric coupler 16-1 of the vehicle TC1 is electrically connected to the pin 21 of the electric coupler 16-2 of the vehicle TC2.

The information transmitting units 10-1 and 10-2, when having detected that the electric coupler 16-1 and the electric coupler 16-2 are coupled on the basis of the contact information from the electric couplers 16-1 and 16-2, perform transmission and reception of a UDP frame with respect to each other and perform transmission of the UDP frame between the central processing units 7-1, 7-2 and the units themselves, respectively. Accordingly, the UDP frame output from the central processing unit 7-1 is input to the central processing unit 7-2 sequentially via the HUB 9-1, the information transmitting unit 10-1, the in-vehicle transmission line 14a, the pin 21 of the electric coupler 16-1, the pin 21 of the electric coupler 16-2, the in-vehicle transmission line 14a, the information transmitting unit 10-2, and the HUB 9-2. Thus, after the formation B1 and the formation B2 are coupled to each other, the train-information management device in the formation B1 and the train-information management device in the formation B2 can perform communication with each other automatically with the Ethernet® protocol.

Figure 4:
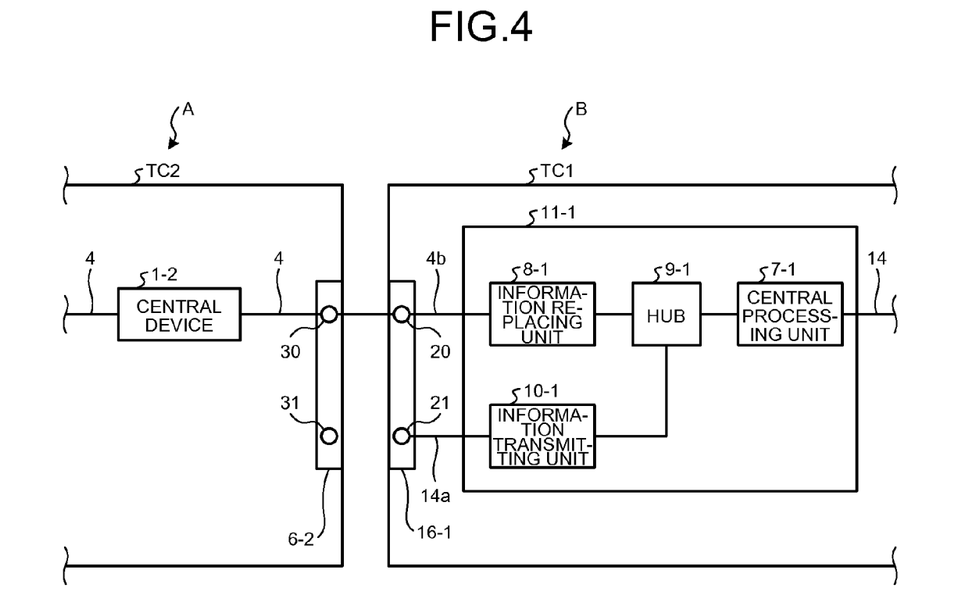
FIG. 4 is a system configuration diagram illustrating when the formation A and the formation B are coupled together.

FIG. 4 is a system configuration diagram illustrating when the formation A and the formation B are coupled. FIG. 4 illustrates an example in which the vehicle TC1 in the formation B and the vehicle TC2 in the formation A are coupled, thereby coupling the formation A to the formation B.

In FIG. 4, the vehicle TC1 (e.g., a coupled vehicle) in the formation B and the vehicle TC2 (e.g., a vehicle to be coupled to the vehicle TC1) in the formation A are illustrated. Further, in FIG. 4, among the on-vehicle devices of the vehicle TC1, the central device 11-1 and the electric coupler 16-1 are illustrated; and among the on-vehicle devices of the vehicle TC2, the central device 1-2 and the electric coupler 6-2 are illustrated. The configuration is the same when the vehicle TC1 in the formation B and the vehicle TC1 in the formation A are coupled, or when the vehicle TC2 in the formation B and the vehicle TC1 in the formation A are coupled, or when the vehicle TC2 in the formation B and the vehicle TC2 in the formation A are coupled.

The central device 11-1 is the same as the central device 11-1 in the formation B illustrated in FIG. 3. When the formation B is coupled with the formation A and it is detected that the electric coupler 16-1 and the electric coupler 6-2 are coupled on the basis of the contact information from the electric coupler 16-1, the information replacing unit 8-1 replaces (or translates into, interprets) the information in accordance with the ARCNET protocol transmitted in the formation A with the information in accordance with the Ethernet® transmitted in the formation B, and it replaces (or translates into, interprets) the information in accordance with the Ethernet® transmitted in the formation B with the information in accordance with the ARCNET protocol transmitted in the formation A.

Operations of the entire system when the formation B and the formation A are coupled are described next. When the formation B and the formation A are coupled, the vehicle TC1 in the formation B1 and the vehicle TC2 in the formation A are mechanically coupled by a coupler (not illustrated). Further, the pin 20 of the electric coupler 16-1 of the vehicle TC1 is electrically connected to a pin 30 of the electric coupler 6-2 of the vehicle TC2. When it is detected that the electric coupler 16-1 and the electric coupler 6-2 are coupled on the basis of the contact information from the electric coupler 16-1, the information replacing unit 8-1 replaces the information transmitted in the formation A with the format of the Ethernet® in the formation B and outputs the replaced information to the HUB 9-1, and it replaces the information transmitted in the formation B with the format of ARCNET in the formation A and outputs the replaced information to the in-vehicle transmission line 4b.

Specifically, a UDP frame transmitted in the formation B is received by the information replacing unit 8-1; and data included in the UDP frame (control data or status data) is temporarily stored in a memory (not illustrated). The data which is stored in the memory is read out at a predetermined interval (e.g., 10 milliseconds or 500 milliseconds), is converted to a packet in accordance with the ARCNET protocol, and is output to the in-vehicle transmission line 4b.

Further, a packet transmitted in the formation A is received by the information replacing unit 8-1; and data included in the packet is temporarily stored in the memory. The data stored in the memory is read out at a predetermined interval (e.g., 500 milliseconds), is converted to a UDP frame in accordance with the Ethernet® protocol, and is output to the HUB 9-1. As a result, after the formation B and the formation A are coupled, the train-information management device in the formation B and the train-information management device in the formation A can communicate with each other automatically.

Operations when the formation A and the formation B are coupled are as described as above. Coupling between formations in which the ARCNET backbone transmission lines are provided, such as coupling between the formations A, is performed in the same manner as that in the conventional techniques. That is, because the information replacing function described above is not provided to this type of formation, by coupling the electric couplers to each other, the train-information management device can perform communication automatically with the ARCNET protocol in the formation after coupling.

A configuration example of the train-information management device that is not made redundant has been described above. A configuration example of the train-information management device that is made redundant is described below. In the following drawings, the same or similar parts are designated by the same or similar reference signs and descriptions thereof are omitted, and only different parts are described.

Figure 6:
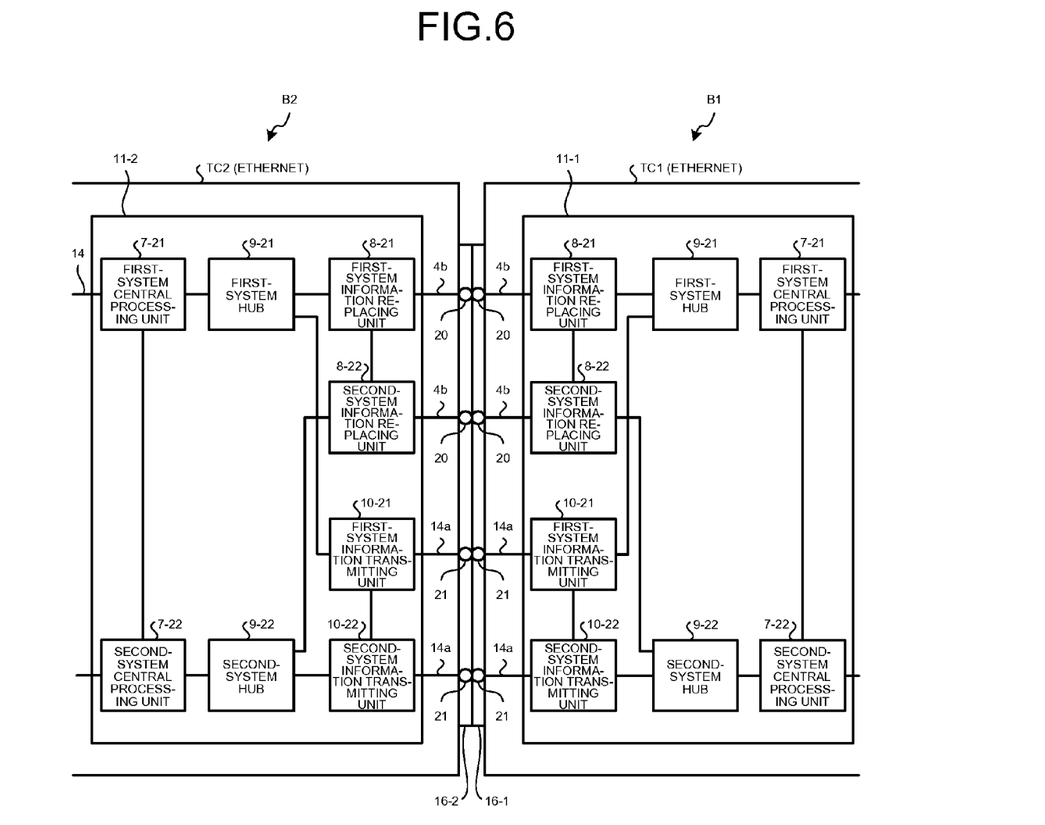
FIG. 6 is a first system configuration diagram illustrating when formations provided with redundant train-information management devices are coupled to each other.
Figure 7:
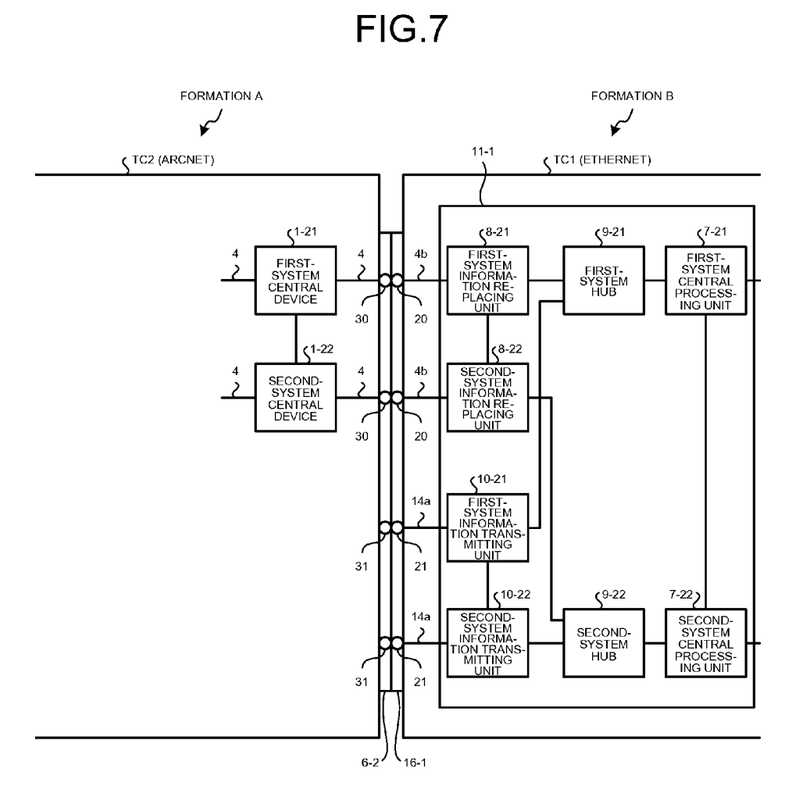
FIG. 7 is a second system configuration diagram illustrating when formations provided with redundant train-information management devices are coupled to each other.
Figure 8:
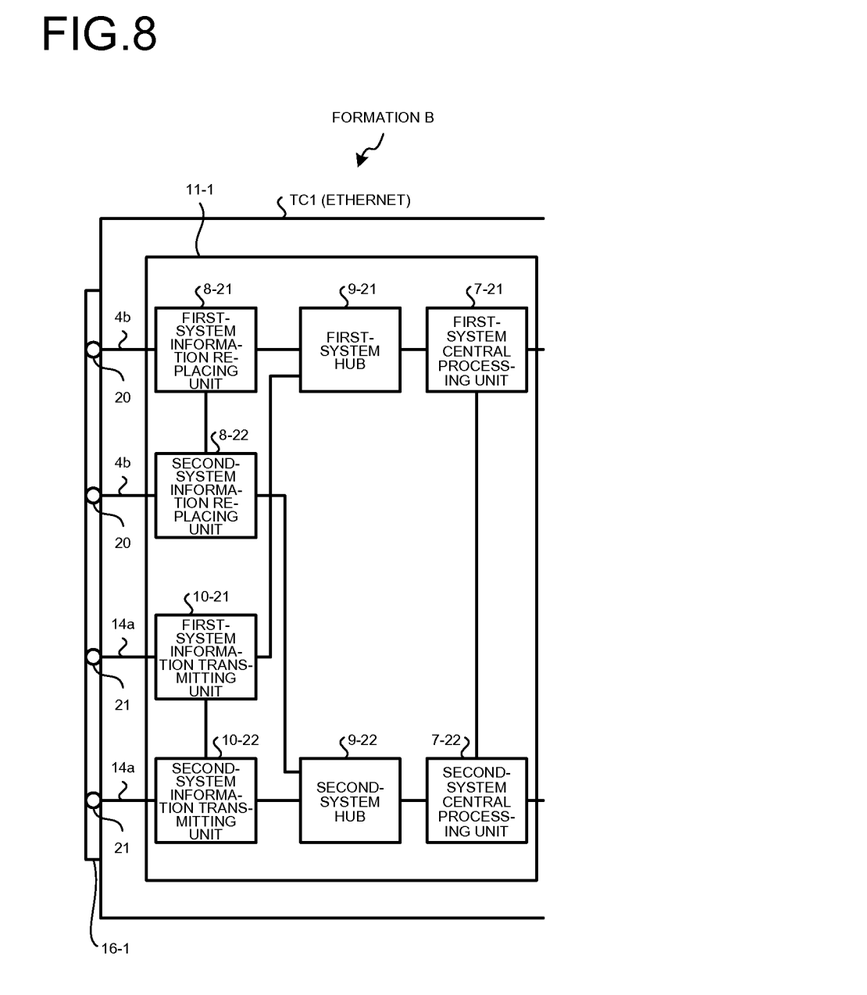
FIG. 8 is a system configuration diagram illustrating when a formation provided with a redundant train-information management device is not coupled to another formation.
Figure 9:
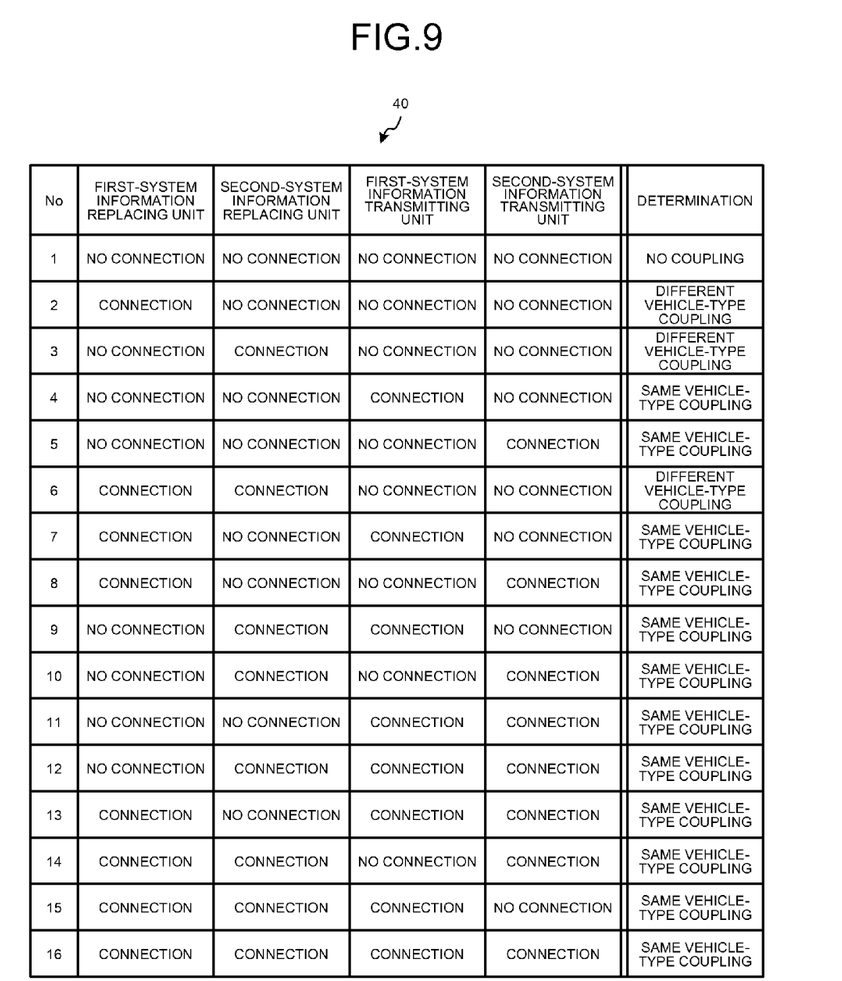
FIG. 9 illustrates an example of a coupling determination table.

FIG. 6 is a first system configuration diagram illustrating when formations provided with redundant train-information management devices are coupled to each other. FIG. 7 is a second system configuration diagram illustrating when formations provided with redundant train-information management devices are coupled to each other. FIG. 8 is a system configuration diagram illustrating when a formation provided with a redundant train-information management device is not coupled. FIG. 9 illustrates an example of a coupling determination table.

Redundant central devices 11-1, 11-2 are respectively provided in the formations B1, B2 illustrated in FIG. 6. The information replacing unit, the information transmitting unit, and the central processing unit in the formation B1 are duplexed as a first system and a second system, respectively; and the information replacing unit, the information transmitting unit, and the central processing unit in the formation B2 are also duplexed as the first system and the second system, respectively. The central device 11-1 in the formation B illustrated in FIGS. 7 and 8 is also configured in the same manner. The central device in the formation A illustrated in FIG. 7 is duplexed as the first system and the second system. The central device 11-2 in the formation B2 illustrated in FIG. 6 is configured in the same manner as that of the central device 11-1 in the formation B1, and descriptions thereof are omitted.

A first-system information replacing unit 8-21 is provided between the in-vehicle transmission line 4b and a first-system HUB 9-21. The first-system information replacing unit 8-21, a first-system central processing unit 7-21, and a first-system information transmitting unit 10-21 are connected to the first-system HUB 9-21. A second-system information replacing unit 8-22 is provided between the in-vehicle transmission line 4b and a second-system HUB 9-22. The second-system information replacing unit 8-22, a second-system central processing unit 7-22, and a second-system information transmitting unit 10-22 are connected to the second-system HUB 9-22.

In the illustrated examples, the first-system information replacing unit 8-21 and the second-system information replacing unit 8-22 are connected; the first-system information transmitting unit 10-21 and the second-system information transmitting unit 10-22 are connected; and the first-system central processing unit 7-21 and the second-system central processing unit 7-22 are connected to each other. Further, between the same functions of the first system and the second system, the connection state information is transmitted to each other. The connection state information is classified into, for example, information indicating that connection with a device in another formation is performed (hereinafter, simply "connection") and information indicating that connection with a device in another formation is not performed (hereinafter, simply "no connection").

The first-system information replacing unit 8-21 receives, for example, the connection state information from the second-system information replacing unit 8-22, and it transmits the received connection state information together with the connection state information of the first-system information replacing unit 8-21 to the first-system central processing unit 7-21. The second-system information replacing unit 8-22, the first-system information transmitting unit 10-21, and the second-system information transmitting unit 10-22, respectively, operate similarly.

Each of the respective central processing units (7-21, 7-22) records therein a coupling determination table 40 illustrated in FIG. 9. In the coupling determination table 40, as a condition of coupling determination logic for performing the coupling determination, "no connection" or "connection" is defined corresponding to the respective information replacing units 8 and the respective information transmitting units 10. The coupling determination is to determine whether a formation to be coupled is not coupled to a coupled formation; whether the formation to be coupled is the same type of formation as the coupled formation; and whether the formation to be coupled is a different type of formation from the coupled formation. FIG. 9 illustrates an example of the coupling determination table 40.

When, for example, another formation is not coupled to the formation B illustrated in FIG. 8, the first-system information replacing unit 8-21, the second-system information replacing unit 8-22, the first-system information transmitting unit 10-21, and the second-system information transmitting unit 10-22 generate the connection state information indicating "no connection". The first-system central processing unit 7-21 and the second-system central processing unit 7-22, having received the connection state information, determine the coupling as "no coupling" (see NO. 1 in FIG. 9) on the basis of these pieces of information and the coupling determination logic of the coupling determination table 40.

When the formation A is coupled to the formation B as illustrated in FIG. 7, the first-system information replacing unit 8-21 and the second-system information replacing unit 8-22 generate the connection state information indicating "connection"; and the first-system information transmitting unit 10-21 and the second-system information transmitting unit 10-22 generate the connection state information indicating "no connection". The first-system central processing unit 7-21 and the second-system central processing unit 7-22, having received these pieces of connection state information, determine the coupling as "different vehicle-type coupling" (see NO. 6 in FIG. 9) on the basis of these pieces of information and the coupling determination logic of the coupling determination table 40.

The coupling determination logic for determining that the coupling is "different vehicle-type coupling" occurs when the first-system information transmitting unit 10-21 and the second-system information transmitting unit 10-22 generate the connection state information indicating "no connection". In the coupling determination table 40 illustrated in FIG. 9, other than the coupling determination logic of NO. 6, the coupling determination logic is set for determining that the coupling is the "different vehicle-type coupling", e.g., when the first-system information transmitting unit 10-21 and the second-system information transmitting unit 10-22 generate the connection state information indicating "no connection" (see Nos. 2 and 3 in FIG. 9).

In FIG. 6, when the formation B2 is connected to the formation B1, the first-system information replacing unit 8-21, the second-system information replacing unit 8-22, the first-system information transmitting unit 10-21, and the second-system information transmitting unit 10-22 generate the connection state information indicating "connection". The first-system central processing unit 7-21 and the second-system central processing unit 7-22, having received these pieces of connection state information, determine the coupling as "same vehicle-type coupling" (see NO. 16 in FIG.

9) on the basis of these pieces of information and the coupling determination logic of the coupling determination table 40.

The coupling determination logic for determining that the coupling is the "same vehicle-type coupling" occurs when at least one of the first-system information transmitting unit 10-21 and the second-system information transmitting unit 10-22 generates the connection state information indicating "connection". In the coupling determination table 40 illustrated in FIG. 9, other than the coupling determination logic of NO. 16, the coupling determination logic is set for determining that the coupling is the "same vehicle-type coupling" when at least one of the first-system information transmitting unit 10-21 and the second-system information transmitting unit 10-22 generates the connection state information indicating "connection" (see Nos. 4, 5, 7 to 15 in FIG. 9).

The operations are described next. The operations are described here assuming that the formation B (B1) illustrated in FIGS. 6 to 8 is a coupled formation.

(1) First, in each of the information replacing units 8 and the information transmitting units 10 of the central device 11-1, information for link establishment (link up) is transmitted to the transmission line (4b, 14a) on a side to be coupled at a predetermined interval. In the central device 11-1 in FIG. 6, the information for the link establishment is also transmitted. The information, for example, is transmitted from the central device 11-1 to the central device 11-2 in FIG. 6; and the information is transmitted from the central device 11-2 to the central device 11-1. In the respective central devices (1-21, 1-22) in FIG. 7, the information for establishing the links is transmitted similarly.

(2) The central device 11-2 (or the central device 1-21, 1-22) in the formation to be coupled responds to the coupled formation when having received the corresponding information from the coupled formation. The respective information replacing units 8 and the respective information transmitting units 10 in the coupled formation having received the response determine that connection to the transmission line (the backbone transmission line 4, the in-vehicle transmission lines 4b, 14a) and the central device 11-2 in the formation to be coupled has been performed.

(3) Between the same functions of the first system and the second system of the central devices 11-1, the connection state information is transmitted to each other. The pieces of connection state information of the first system and the second system are transmitted to the respective central processing units 7. The first-system information replacing unit 8-21 in FIG. 6 transmits, for example, the connection state information generated by the first-system information replacing unit 8-21 and the connection state information generated by the second-system information replacing unit 8-22 to the first-system central processing unit 7-21. The second-system information replacing unit 8-22 similarly transmits the connection state information generated by the first-system information replacing unit 8-21 and the connection state information generated by the second-system information replacing unit 8-22 to the first-system central processing unit 7-21.

For example, as illustrated in FIG. 6, when the formation B2 is connected to the formation B1, the respective information replacing units 8 and the respective information transmitting units 10 of the central device 11-2 are connected to the respective information replacing units 8 and the respective information transmitting units 10 of the central device 11-1. Therefore, the respective information replacing units 8 and the respective information transmitting units 10 of the central device 11-1 generate the connection state information indicating "connection"; and these pieces of information are transmitted to the first-system central processing unit 7-21 or the second-system central processing unit 7-22.

As illustrated in FIG. 7, when the formation A is connected to the formation B, the respective central devices 1 are connected to the respective information replacing units 8 of the central device 11-1. Therefore, the respective information replacing units 8 of the central device 11-1 generate the connection state information indicating "connection"; and the respective information transmitting units 10 generate the connection state information indicating "no connection". These pieces of information are transmitted to the first-system central processing unit 7-21 or the second-system central processing unit 7-22.

Further, as illustrated in FIG. 8, when the formation to be coupled is not connected to the formation B, the respective information replacing units 8 and the respective information transmitting units 10 of the central device 11-1 generate the connection state information indicating "no connection"; and these pieces of information are transmitted to the first-system central processing unit 7-21 or the second-system central processing unit 7-22.

(4) The first-system central processing unit 7-21, having received these pieces of information, determines the coupling, i.e., the coupling determination, on the basis of the connection state information and the coupling determination table 40. Because the first-system central processing unit 7-21 and the second-system central processing unit 7-22 transmit information to each other, e.g., if the first-system central processing unit 7-21 cannot receive the connection state information normally, e.g., due to an error, the second-system central processing unit 7-22 having detected an abnormality in the first-system central processing unit 7-21 performs the coupling determination.

(5) A coupling determination result, obtained by the first-system central processing unit 7-21 or the second-system central processing unit 7-22, is transmitted to the respective information replacing units 8 and the respective information transmitting units 10. If the determination result is "same vehicle-type coupling", for example, the respective information transmitting units 10 in the formations B1 and B2 illustrated in FIG. 6 perform transmission and reception of information by the UDP frame. If the determination result is "different vehicle-type coupling", for example, the respective information replacing units 8 in the formation B illustrated in FIG. 7 perform replacement of the information. If the determination result is "no coupling", the respective information transmitting units 10 and the respective information replacing units 8 continue transmission of information for link establishment.

In this manner, between the same functions of the first system and the second system in the central device 11-1 (11-2), the connection state information is transmitted to each other. The connection state information generated by the function of the first system and the connection state information generated by the function of the second system are transmitted to the respective central processing units 7; and the respective central processing units 7 determine the coupling state with the formation to be coupled on the basis of these pieces of information and the coupling determination table 40. Accordingly, also in the central device 11 having a duplexed structure, coupling determination can be performed accurately.

The information replacing units 8-1, 8-2 and the information transmitting units 10-1, 10-2 illustrated in FIGS. 3 and 4 are configured so as to perform coupling determination on the basis of the contact information from the electric couplers 16-1 and 16-2. However, the information replacing units 8-1, 8-2 and the information transmitting units 10-1, 10-2 can be configured to perform coupling determination by using the information for link establishment and the connection state described in the embodiment illustrated in FIGS. 6 to 8.

As described above, the train-information management device according to the present embodiment includes the central device 11-1 that is connected to the Ethernet® provided over a plurality of vehicles constituting a train formation and that manages vehicle information (a UDP frame) in accordance with the Ethernet® protocol. The central device 11-1 includes the information replacing unit 8-1 that, when having detected that a second formation (A) including the train-information management device that manages vehicle information (a packet) in accordance with the ARCNET protocol is coupled to a coupled vehicle in a first formation (B, B1) including the train-information management device, replaces the vehicle information from the first formation with the vehicle information in accordance with the ARCNET protocol, outputs the replaced vehicle information to the second formation, replaces the vehicle information from the second formation with the vehicle information in accordance with the Ethernet® protocol, and outputs the replaced vehicle information to the first formation. The central device 11-1 also includes the information transmitting unit 10-1 that, when having detected that the first formation is coupled to a third formation (B2) of the same type as the first formation, outputs the vehicle information from the third formation to the first formation, and outputs the vehicle information from the first formation to the third formation. Due to this configuration, the formation B1 compatible with the Ethernet® or the formation A compatible with the ARCNET can be coupled, thereby enabling operations of the train-information management device in the formation after the formation B and the formation A are coupled.

The central device 11-1 includes a central processing unit that manages the vehicle information. An information replacing unit, an information transmitting unit, and the central processing unit are each duplexed as a first system and a second system. In the respective central processing units (7-21, 7-22), the connection state information indicating whether the device (the central device 11-2, the first-system central device 1-21, the second-system central device 1-22) in the formation to be coupled is connected to the respective duplexed information replacing units and respective information transmitting units, and a table (the coupling determination table 40) in which the respective duplexed information replacing units and respective information transmitting units are stored in association with each other are established. The respective central processing units perform coupling determination on the basis of the coupling determination table and the pieces of information indicating the connection state, which are generated by the respective duplexed information replacing units and respective information transmitting units. The respective duplexed information replacing units replace the vehicle information on the basis of the coupling determination result from the respective central processing units; and the respective duplexed information transmitting units transmit the vehicle information on the basis of the coupling determination result from the respective central processing units. With this configuration, the formations having a different transmission specification can be coupled to each other, and the reliability can be improved when compared to a train-information management device that is not made redundant.

The respective information replacing units (8-21, 8-22) transmit the connection state information generated by one of the information replacing units (e.g., the first-system information replacing unit 8-21) and the connection state information generated by the other of the information replacing units (e.g., the second-system information replacing unit 8-22) together to the respective central processing units. The respective information transmitting units (10-21, 10-22) transmit the connection state information generated by one of the information transmitting units (e.g., the first-system information transmitting unit 10-21) and the connection state information generated by the other of the information transmitting units (e.g., the second-system information transmitting unit 10-22) together to the respective central processing units. The respective central processing units perform coupling determination on the basis of the pieces of connection state information from the respective information replacing units and the respective information transmitting units and from the coupling determination table 40. With this configuration, the accuracy of coupling determination in the central device 11 having a duplexed structure can be improved, and the reliability can be further improved.

According to the train-information management method of the present embodiment, a central device includes a detection step of detecting, on the basis of contact information acquired from an electric coupler provided in the coupled vehicle in the first formation, that a second formation including a train-information management device that manages vehicle information in accordance with the ARCNET protocol is coupled to a coupled vehicle in a first formation having a train-information management device or that a third formation of the same type as the first formation is coupled to the first formation; an information replacing step at which, when coupling of the second formation is detected at the detection step, vehicle information from the first formation is replaced with vehicle information in accordance with the ARCNET protocol and the replaced vehicle information is output to the second formation, and vehicle information from the second formation is replaced with vehicle information in accordance with the Ethernet® protocol and the replaced vehicle information is output to the first formation; and an information transmission step at which, when coupling of the third formation is detected at the detection step, vehicle information from the third formation is output to the first formation, and vehicle information from the first formation is output to the third formation. With this configuration, the formation B1 compatible with the Ethernet® or the formation A compatible with the ARCNET can be coupled, thereby enabling operations of the train-information management device in the formation after the formation B and the formation A are coupled to each other.

The train-information management device according to the present embodiment is only an example of the content of the present invention, and it is possible to combine the invention with other well-known techniques, and it is not necessary to mention that the present invention can be configured while modifying it without departing from the scope of the invention, such as omitting a part of its configuration.

INDUSTRIAL APPLICABILITY

As described above, the present invention is applicable to a train-information management device, and is particularly useful as an invention that enables coupling of a formation in which a train-information management device compatible with the Ethernet® is provided and a formation in which a train-information management device compatible with the ARCNET is provided.

REFERENCE SIGNS LIST 1-1, 1-2, 1-21, 1-22 central device, 2-1, 2-2, 2-3, 2-4 terminal device, 3-1, 3-2, 3-3 device, 3-4 master controller, 3-5, 3-6, 3-7, 3-8 device, 3-9 VVVF, 3-10 braking device, 4 backbone transmission line, 4b in-vehicle transmission line, 5 branch transmission line, 6-1, 6-2 electric coupler, 7-1, 7-2, 7-21, 7-22 central processing unit, 8-1, 8-2, 8-21, 8-22 information replacing unit, 9-1, 9-2, 9-21, 9-22 HUB, 10-1, 10-2, 10-21, 10-22 information transmitting unit, 11-1, 11-2 central device, 14 backbone transmission line, 14a in-vehicle transmission line, 16-1, 16-2 electric coupler, 20, 21, 30, 31 pin, 40 coupling determination table.

The invention claimed is:

1. A train-information management device comprising a central device that is connected to the Ethernet® provided over a plurality of vehicles constituting a train formation and that manages vehicle information in accordance with the Ethernet® protocol,
wherein the central device comprises:
a central processor that manages the vehicle information, where an information replacer, an information transmitter, and the central processor of first and second train formations are duplexed as a first system and a second system, respectively, and the central processor establishes connection state information indicating whether devices in train formations to be coupled are connected to respective duplexed information replacers and to respective information transmitters, and establishes a table in which the respective duplexed information replacers and the respective information transmitters are stored in association with each other,
the information replacer that, when having detected that a second formation including a train-information management device that manages vehicle information in accordance with an ARCNET protocol is coupled to a coupled vehicle in the first train formation having the train-information management device, replaces vehicle information from the first train formation with vehicle information in accordance with the ARCNET protocol and outputs the replaced vehicle information to the second train formation, and replaces the vehicle information from the second train formation with the vehicle information based on the connection state information in accordance with the Ethernet® protocol and outputs the replaced vehicle information to the first train formation, and
an information transmitter that, when having detected that a third train formation of a same type as the first train formation is coupled to the first train formation based on the connection state information, outputs vehicle information from the third train formation to the first formation, and outputs the vehicle information from the first train formation to the third train formation.

2. The train-information management device according to claim 1, wherein the respective central processors of each train formation are configured to perform coupling determination on the basis of pieces of information indicating a connection state, which are generated by the respective duplexed information replacers and the respective information transmitters, and what is read from the table, the respective duplexed information replacers replace the vehicle information on the basis of a coupling determination result from the respective central processors, and the respective duplexed information transmitters transmit the vehicle information on the basis of the coupling determination result from the respective central processors.

3. The train-information management device according to claim 2, wherein the respective information replacers transmit connection state information generated by one of the information replacers and connection state information generated by the other of the information replacers together to the respective central processors, the respective information transmitters transmit connection state information generated by one of the information transmitters and connection state information generated by the other of the information transmitters together to the respective central processors, and the respective central processors perform coupling determination on the basis of the pieces of connection state information from the respective information replacers and the respective information transmitters and what is read from the table.

4. A train-information management method executed by a train-information management device including a central device that is connected to the Ethernet® provided over a plurality of vehicles constituting a train formation and that manages vehicle information in accordance with the Ethernet® protocol, wherein the central device executes at least:
a management step of managing the vehicle information, duplexing an information replacer, an information transmitter, a central processor of first and second train formations as a first system and a second system, respectively, and establishing connection state information indicating whether devices in a formation to be coupled are connected to respective duplexed information replacers and to respective information transmitters and a table in which the respective duplexed information replacers and the respective information transmitters are stored in association with each other,
a detection step of detecting, on the basis of contact information acquired from an electric coupler provided in a coupled vehicle in a first train formation, that a second train formation including a train-information management device that manages vehicle information in accordance with an ARCNET protocol is coupled to the coupled vehicle in the first train formation having the train-information management device, or a third train formation of a same type as the first train formation is coupled to the first train formation,
an information replacing step at which, when coupling of the second train formation is detected at the detection step, vehicle information from the first train formation is replaced with vehicle information in accordance with the ARCNET protocol and the replaced vehicle information is output to the second train formation and vehicle information from the second train formation is replaced with vehicle information in accordance with the Ethernet® protocol and the replaced vehicle information is output to the first train formation based on the connection state information and information stored in the table, and
an information transmission step at which, when coupling of the third train formation is detected at the detection step, vehicle information from the third train formation is output to the first train formation and at which the vehicle information from the first train formation is output to the third train formation based on the connection state information and information stored in the table.

* * * * *